April 24, 1962 W. L. JACKSON ETAL 3,030,987
APPARATUS FOR PRODUCING WOOD FLAKES
Filed July 22, 1958 3 Sheets-Sheet 2
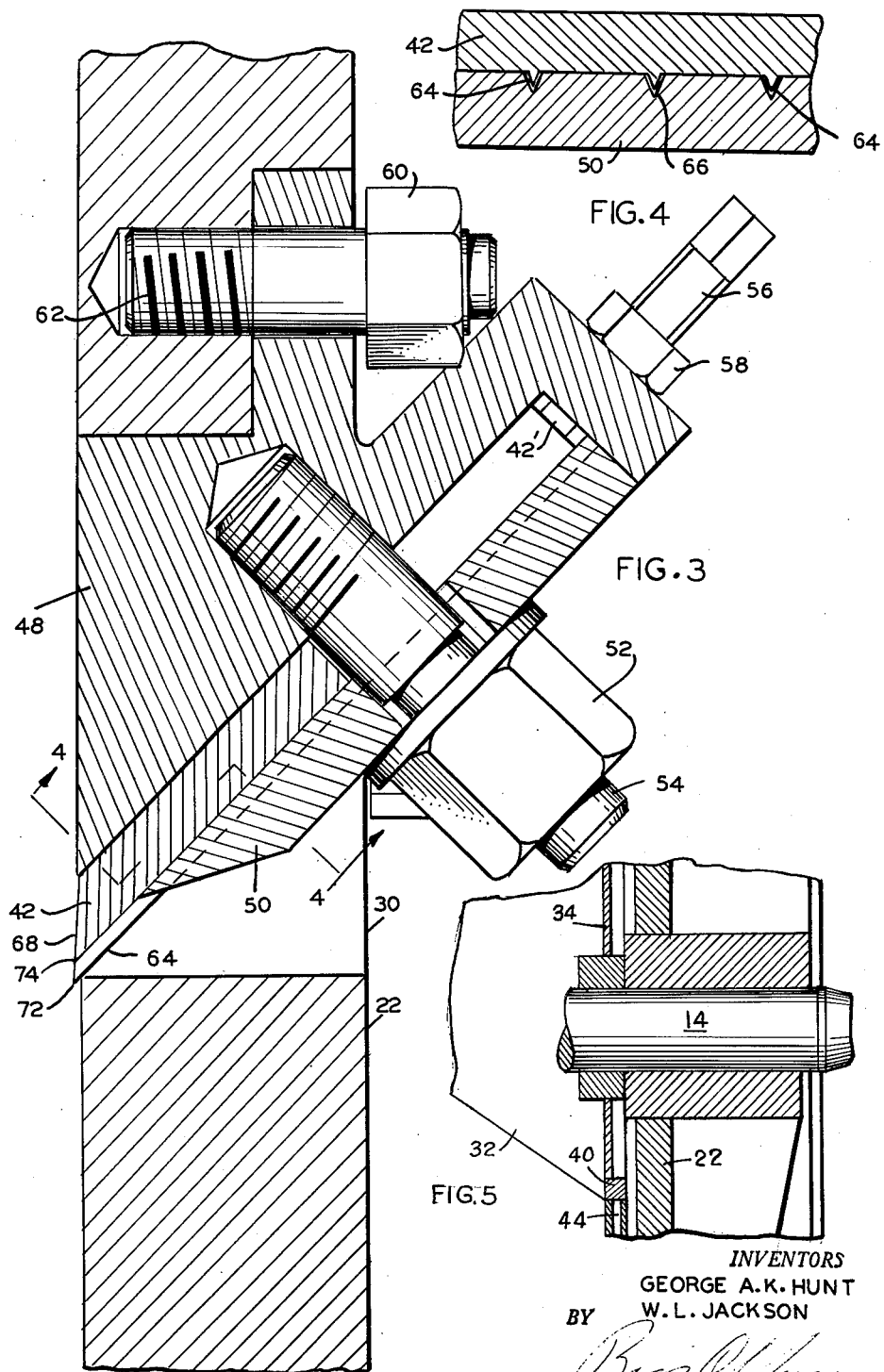
INVENTORS
GEORGE A. K. HUNT
W. L. JACKSON
BY
ATTORNEY

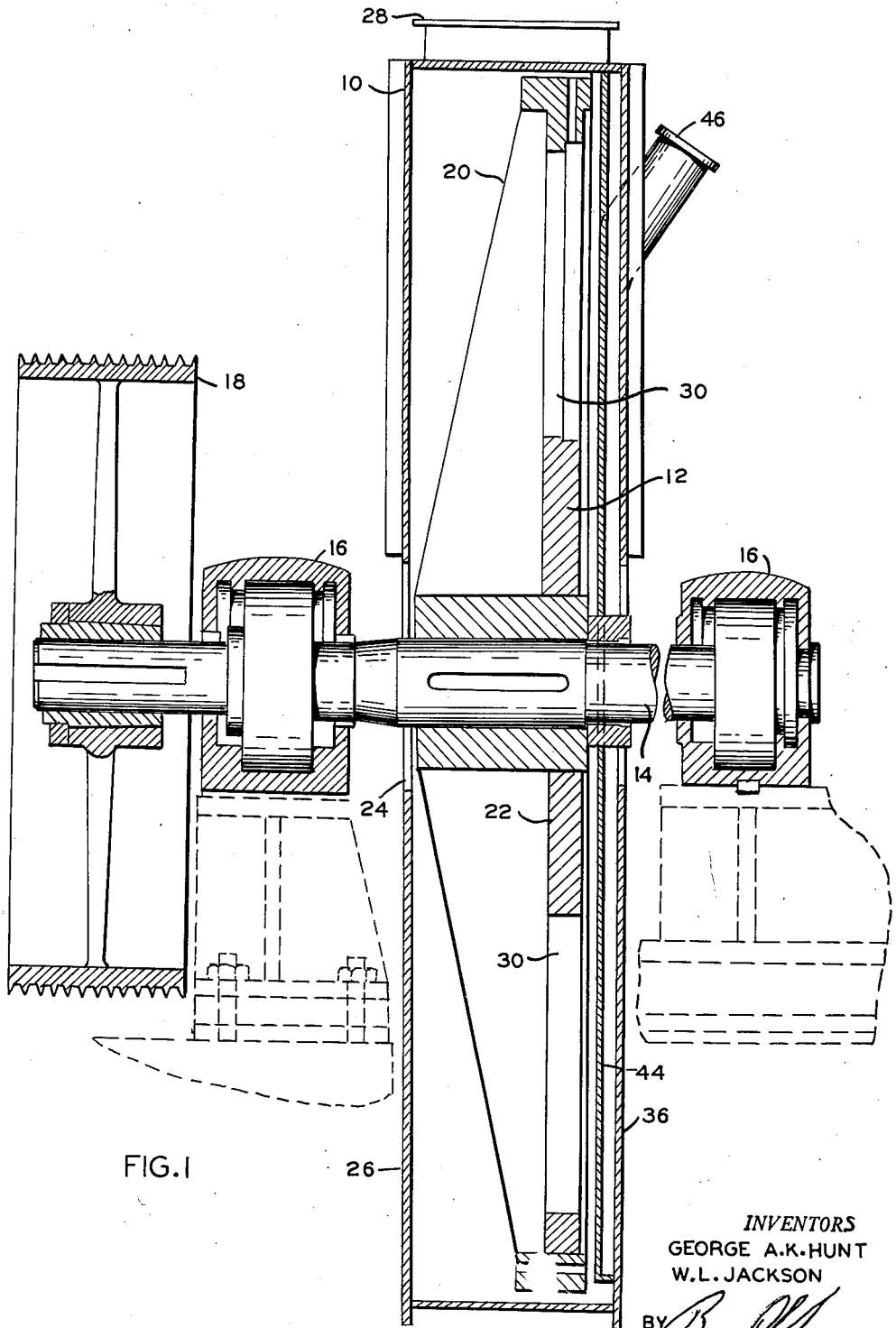

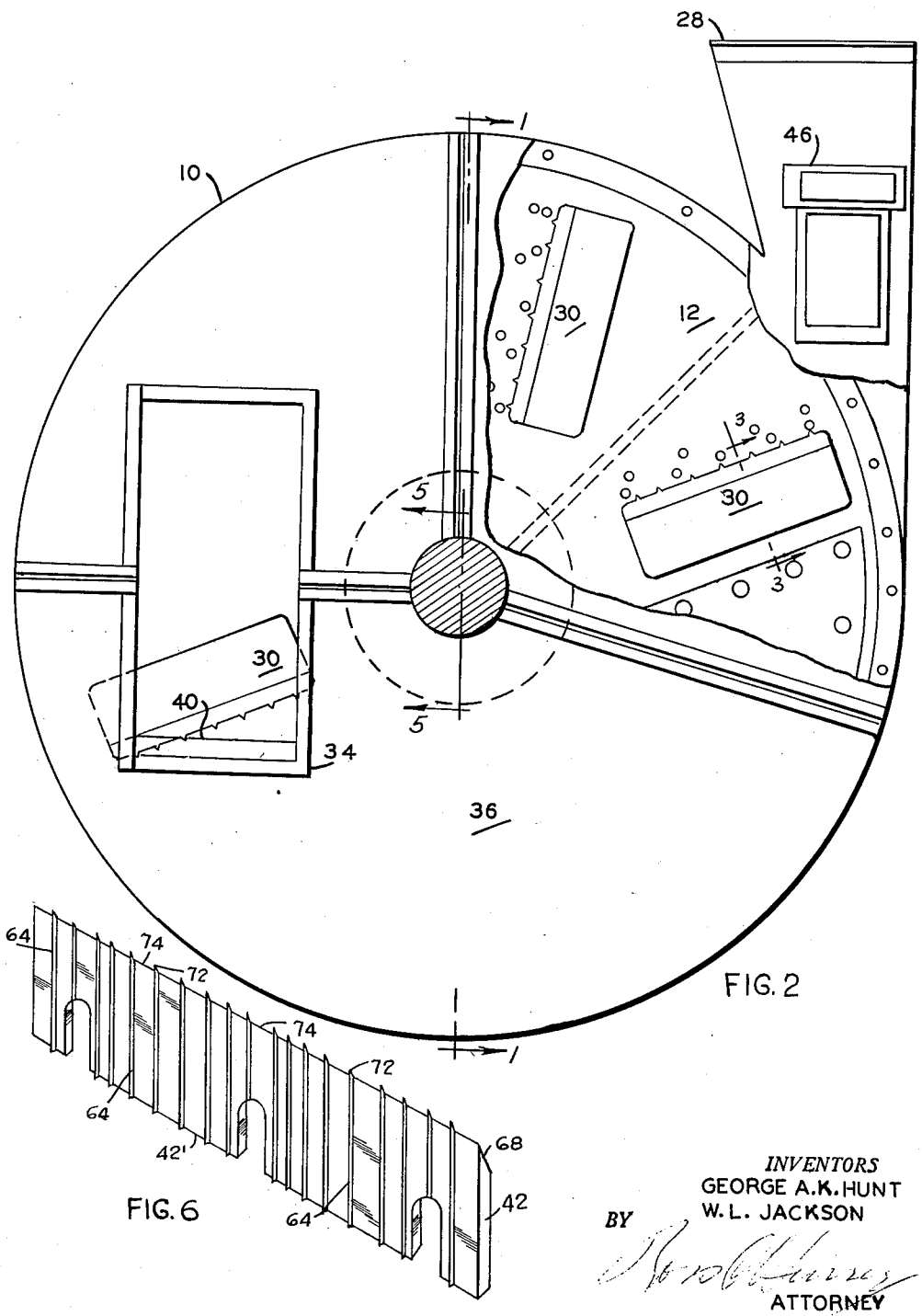

_United States Patent Office_

3,030,987
Patented Apr. 24, 1962

3,030,987
APPARATUS FOR PRODUCING WOOD FLAKES
Walter L. Jackson, High Point, N.C., and George A. K. Hunt, Midlothian, Va., assignors to Miller Hofft, Inc., Richmond, Va., a corporation of Delaware
Filed July 22, 1958, Ser. No. 750,113
4 Claims. (Cl. 144—42)

It is an object of this invention to provide an apparatus for the rapid reduction of billets of wood into flakes of substantially uniform size and thickness.

It is a further object of this invention to provide an apparatus as aforesaid, in which the face of each billet operated on is subdivided lengthwise into a plurality of flakes of substantially uniform length in the fibre direction of the wood.

It is a further object of this invention to provide in an apparatus as aforesaid unitary flaking means which will subdivide the flakes lengthwise of the billet and simultaneously control the thickness of the flakes.

It is a further object of this invention to provide a cutting means as aforesaid, in which the longitudinal subdividing means may be sharpened simultaneously with the flaking means at a single operation.

It is a further object of this invention to provide an apparatus as aforesaid, in which the production of chunks and other parts of wood billets too small to be flaked, will be minimized and such chunks and other parts will be segregated from the flakes and separately discharged from the apparatus.

The above and other objects will be made clear from the following detailed description, taken in connection with the annexed drawings, in which:

FIGURE 1 is a side elevation, partly in section of the improved apparatus taken on the line 1—1 of FIGURE 2;

FIGURE 2 is a front elevation, also partly in section of the improved apparatus;

FIGURE 3 is a detailed sectional view of the improved cutter and its mounting taken on the line 3—3 of FIGURE 2;

FIGURE 4 is a section on the line 4—4 of FIGURE 3;

FIGURE 5 is a partial section viewed in the direction opposite that of FIGURE 1 and taken on the line 5—5 of FIGURE 2.

FIGURE 6 is a perspective view of the cutter itself.

The formation of rigid boards by mixing wood particles with a suitable binder and hot pressing the mixture into rigid panels, is a venerable art. In recent years, the trend has been toward the formation of boards from flakes of wood rather than from such particles as would be produced by ordinary hogging operations. For optimum board quality, the flakes should be quite substantial in two dimensions (length and width) and quite thin in the third dimension (thickness). When particle board is produced by conventional hogging methods, it is quite impossible to exercise any real control over all three dimensions. The hogging method has the advantage of being usable on random shapes and sizes of waste wood. The flaking method produces a board of superior strength and surface finish, with greatly improved edge characteristics but the method is not usable on the random shapes and sizes encountered in purely waste wood operations. The billets to be flaked must be reasonably uniform in size and shape and therefore represent wood in a form which would have other and competitive economic uses. For this reason, the flaking operation as distinct from a mere hogging of waste wood, must operate at maximum efficiency. That is, the yield of usable flakes must approach as nearly as possible the total input of wood.

The flaking operation as heretofore carried out, has involved a preliminary transverse sawing or gouging operation to define lengthwise of the billet, one major dimension of the flakes to be formed. The second major dimension is determined in part by the width of the face of the billet and the third or thickness dimension is determined by the exposure of the billet face to the knife. As flakes are struck off, they pass through the knife carrying disc at an angle which tends to break the chips parallel to the grain if the billet face is too wide. The product of the sawing or gouging operation represents waste in the production of chunks and fines which are undesirable as furnish for the formation of the flake type board.

The present invention contemplates parting the fibres along spaced transverse lines, without actual removal of fibre. This parting of the fibre is immediately followed by a flaking operation, defining flakes between the transverse lines of parting. When the knives are freshly sharpened, substantially all the fibre is converted into usable flakes. As the knives dull, however, there will be generated a small amount of fines and provision is made at the point of formation for the immediate segregation of such waste material.

Referring now to FIGURES 1 and 2, there is shown a casing 10, in which is mounted a rotor 12, keyed to a shaft 14, supported in external bearings 16 and driven by a pulley 18. The rotor 12 has on its rearward face a plurality of ribs 20, which act not only to strengthen the disc portion 22 of the rotor 12 but also act as impeller blades to direct air drawn through a central inlet 24 in the rear face 26 of the casing 10, to a tangential outlet 28.

Radially directed blade openings 30 are formed in the disc portion 22 of the rotor 12. As shown in FIGURE 5, a feed chute 32 directs billets of wood to a feed opening 34 in the front face 36 of the casing 10. The feed chute 32 is provided with conventional feed means. At the bottom of the feed chute 32 is secured a dead knife 40, for coaction with cutters 42, mounted in the disc 22 and best shown in FIGURES 3 and 4.

A baffle 44 is spaced inwardly from the front wall 36 and is aligned with the edge of the dead knife 40. This baffle communicates with an auxiliary outlet 46 also formed in the front wall 36 of the casing 10.

The cutter 42 (best shown in FIGURES 3, 4 and 6) is mounted in a blade holder 48 and secured in place by a blade clamp 50, secured by nuts 52, threaded to studs mounted in the holder 48. Adjusting screws 56, with lock nuts 58, are also threaded into the holder 48 and bear on the rear edge 42' of the cutter 42. The holder 48 is itself secured to the disc 22 by nuts 60, which engage studs 62, threaded into the disc 22 adjacent the openings 36.

On the underside of the cutter 42 are formed a series of spaced parallel ribs 64, accommodated in loosely mating grooves 66 formed in the clamp 50. The front edge 68 of the cutter 42, including the ends of the ribs 64, is beveled to protrude slightly beyond the adjacent face of the disc 22. Thus the ribs 64 provide sharp entering points 72, followed immediately by a cutting edge 74. When a cutter 42 is to be sharpened, it is only necessary to back off the nuts 52 and withdraw the cutter 42 from the holder 48. The cutter 42 is then clamped in a suitable grinder and reground to reconstitute the bevel of its front edge 68. The cutter is then reinserted in the holder 48 and adjusted by means of screws 56 to the condition shown in FIGURE 3. It is then only necessary to tighten the nuts 52 to restore the cutter to serviceable condition.

Sharp points 72 of the ribs 64 project very slightly further beyond the adjacent face of the disc 22 than do the edges 74. When these points encounter the face of a billet of wood, they operate to part the face by a lateral displacement of the fibre, rather than the removal of the fibre. This, far from having a deleterious effect, results in stronger bonding between adjacent superimposed flakes in the final board.

Wood, like any other material which is a natural product, continually varies in density and composition. With a freshly sharpened cutter, operating on clean, uniform wood, there will be virtually no waste. Cutters, however, dull between sharpenings and wood cannot be kept clear of occasional knots or soft spots. When these are encountered by a cutter in need of resharpening, there may be some removal of "chunky" material by the points 72. Such chunks will fall between the front wall 36 of the casing 10 and the baffle 44, best seen in FIGURE 1. They are thus segregated from acceptable flakes and are removed through the auxiliary outlet 46. The acceptable flakes pass through the disc 22 and become subject to the impelling action of the ribs 20 and are discharged through the outlet 28.

What is claimed is:

1. The combination of a cutter for a wood flaking machine and clamping means therefor comprising: an elongated strip of knife stock of small thickness relative to its length and width and of a length greatly exceeding its width; a series of parallel V-shaped ridges extending entirely across the widthwise dimension of and projecting from one face of said strip, the bases of said ridges being spaced lengthwise of the strip by an amount several times the base width of said ridges to define coplanar areas capable of being clamped without pressure on the apices of said ridges by clamping means extending from adjacent the hereinafter mentioned straight cutting edges between said ridges to and including the widthwise rear end of the cutter between said ridges, one edge of said strip being beveled inwardly from and including said ridges to form straight cutting edges between said ridges, the apices of said ridges proceeding in straight lines to intersect said bevel and being spaced a distance equal to the width of a flake to be formed, the intersection of said apices and said bevel lying forward of said cutting edges an amount sufficient, when the cutter is presented to the work with its widthwise dimension at an acute angle to the direction of movement of the tool, to define not substantially more than the thickness of a flake to be severed by said cutting edges on the same side of said strip as said clampable areas, said clamping means having V-shaped grooves in registry with and loosely receiving the ridges of said cutter, the material of said clamping means between said grooves bearing directly on the adjacent faces of said cutter.

2. The combination of a cutter for a wood flaking machine and clamping means therefor comprising: an elongated strip of knife stock of small thickness relative to its length and width and of a length greatly exceeding its width; a series of parallel V-shaped ridges extending entirely across the widthwise dimension of and projecting from one face of said strip, the bases of said ridges being spaced lengthwise of the strip by an amount several times the base width of said ridges to define coplanar areas capable of being clamped without pressure on the apices of said ridges by clamping means extending from adjacent the hereinafter mentioned straight cutting edges between said ridges to and including the widthwise rear end of the cutter between said ridges, one edge of said strip being beveled inwardly from and including said ridges to form straight cutting edges between said ridges, the apices of said ridges proceeding in straight lines to intersect said bevel and being spaced a distance equal to the width of a flake to be formed, the intersection of said apices and said bevel lying forward of said cutting edges an amount sufficient, when the cutter is presented to the work with its widthwise dimension at an acute angle to the direction of movement of the tool, to define not substantially more than the thickness of a flake to be severed by said cutting edges on the same side of said strip as said clampable areas, said clamping means comprising a plate substantially coextensive, lengthwise, with said strip, said plate having V-shaped grooves in registry with and loosely receiving the ridges of said cutter, the material of said clamping plate between said grooves bearing directly on the adjacent faces of said cutter strip.

3. The combination of a cutter for a wood flaking machine and clamping means therefor comprising: an elongated strip of knife stock of small thickness relative to its length and width and of a length greatly exceeding its width; a series of parallel V-shaped ridges extending entirely across the widthwise dimension of and projecting from one face of the strip, the bases of said ridges being spaced lengthwise of the strip by an amount several times the base width of said ridges to define coplanar areas capable of being clamped without pressure on the apices of said ridges by clamping means extending from adjacent the hereinafter mentioned straight cutting edges between said ridges to and including the widthwise rear end of the cutter between said ridges, one edge of said strip being beveled inwardly from and including said ridges to form straight cutting edges between said ridges, the apices of said ridges proceeding in straight lines to intersect said bevel and being spaced a distance equal to the width of a flake to be formed, the intersection of said apices and said bevel lying forward of said cutting edges an amount sufficient, when the cutter is presented to the work with its widthwise dimension at an acute angle to the direction of movement of the tool, to define not substantially more than the thickness of a flake to be severed by said cutting edges on the same side of the strip as said clampable areas; said clamping means having grooves in registry with and loosely receiving the ridges of said strip, the material of said clamping means between said grooves bearing directly on the adjacent faces of said strip.

4. A machine for producing wood flakes comprising: a rotatable disc; a plurality of clamps and cutters as set forth in claim 3 mounted generally radially of said disc; means for delivering billets of wood to said disc and said cutters; each of said cutters acting to sever a plurality of flakes from the adjacent billet without affecting or being affected by the action of either the preceding or succeeding cutters.

References Cited in the file of this patent

UNITED STATES PATENTS

| 439,007 | Henry | Oct. 21, 1890 |
| 513,853 | Wohnlich | Jan. 30, 1894 |
| 604,813 | Ward | May 31, 1898 |
| 1,039,441 | Ray | Sept. 24, 1912 |
| 2,130,457 | Fickett | Sept. 20, 1938 |
| 2,299,248 | Ottersland | Oct. 20, 1942 |
| 2,349,034 | Elmendorf | May 16, 1944 |
| 2,712,842 | Fahrni | July 12, 1955 |
| 2,739,627 | Vohringer | Mar. 27, 1956 |
| 2,776,688 | Clark | Jan. 8, 1957 |
| 2,825,371 | Forman | Mar. 4, 1958 |

FOREIGN PATENTS

| 444,101 | Great Britain | Mar. 13, 1936 |